July 28, 1931.   L. D. J. A. DUNOYER   1,816,723
SECURING MEANS FOR LABORATORY OR WORKSHOP APPARATUS
Filed Nov. 14, 1929   2 Sheets-Sheet 1

L. D. J. A. Dunoyer
INVENTOR

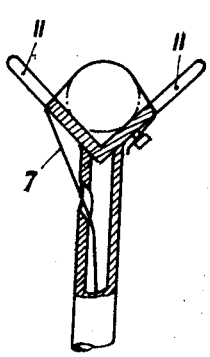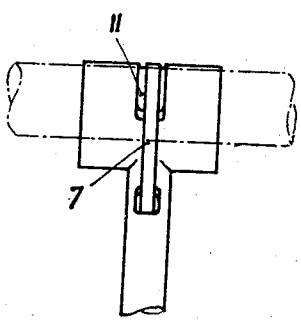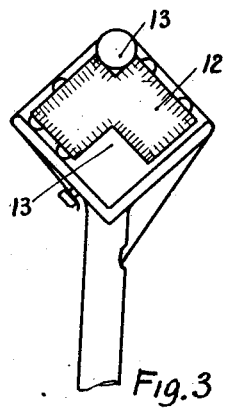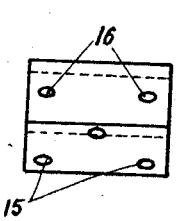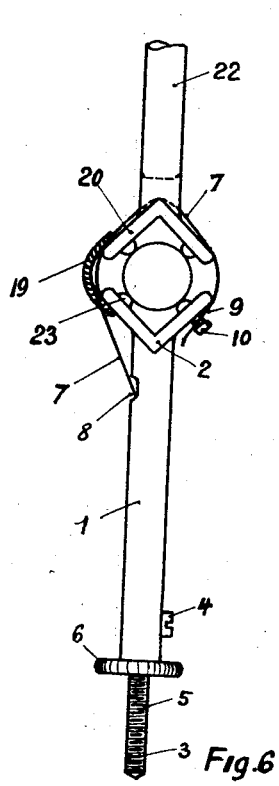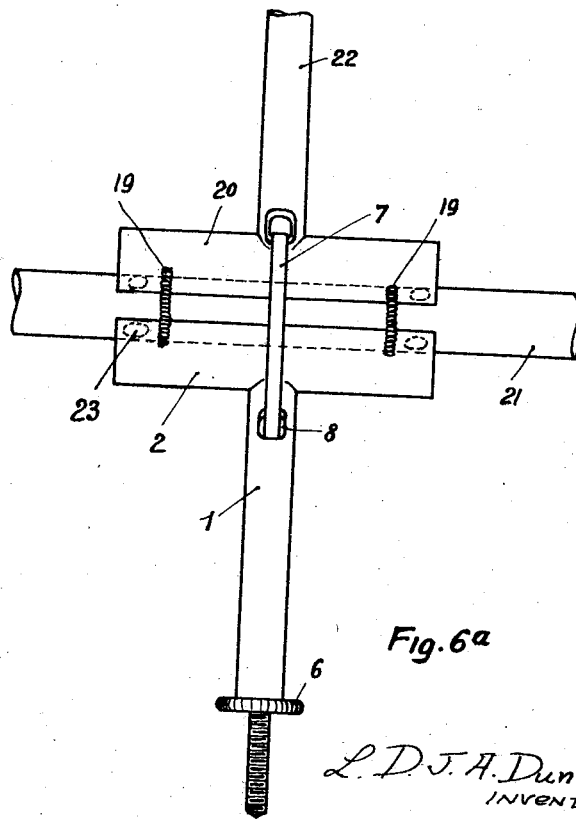

Patented July 28, 1931

1,816,723

UNITED STATES PATENT OFFICE

LOUIS DOMINIQUE JOSEPH ARMAND DUNOYER, OF NEUILLY-SUR-SEINE, FRANCE

SECURING MEANS FOR LABORATORY OR WORKSHOP APPARATUS

Application filed November 14, 1929, Serial No. 407,303, and in France November 20, 1928.

It is often necessary in laboratories or workshops to fix an object in space in a predetermined position. For this purpose, the object is gripped by a pair of tongs comprising a cylindrical extension or tailpiece which is inserted in one of the jaws of a connecting clamp while the other jaw incloses a cylindrical rod which is usually vertical and mounted on a base, thereby constituting a support. The object may be brought into any desired position and fixed therein by sliding and rotating the clamp along the vertical rod of the support whereupon the extension or tailpiece of the tongs is also adapted to slide and rotate in the clamp.

The supporting tongs now existing have usually the drawback that the position in space of the object to be fixed is altered by the securing action proper so that it is necessary to make lengthy adjustments for fixing the object in the desired position and when the object is removed, it is practically impossible to replace it in exactly the same position. Moreover, the same tongs cannot be fastened equally as well over rods of very small diameter, for instance, a few millimeters and those of large diameter, for instance, several centimeters. Finaly, these tongs are usually not able to be fastened over very short members such as for instance a flat washer, the thickness of which is only a few millimeters.

The present invention relates to fastening tongs which do not have the aforesaid drawbacks. A special feature of these tongs is that the position in space of a cylindrical or prismatic member to be fastened is exactly the same after as before the fastening. This member may therefore be removed and inserted again with the assurance that its axis will occupy the same position in space.

This fastening and fixing device is characterized by the fact that it comprises a V-shaped member adapted to receive the object to be held or gripped and a flexible strap secured through one end to the V-shaped member and through the other end to suitable tensioning means.

If the object to be held or gripped is cylindrical or prismatic with faces relative to the same angle as the V-shaped member, the two faces of the V-shaped member will form a bearing with regard to which the position in space of the axis of the object is geometrically determined and consequently is always the same.

Various details, which will hereinafter be explained, permit the adaptation of the invention to the several cases to be met with in practice and the utilization of all the advantages thereof.

I have described hereinbelow by way of example and shown on appended drawings several forms of execution of my invention.

Figs. 2 and 2a are corresponding views of tongs adapted for use with parts having a small diameter.

Fig. 3 is an end view of a modification of the latter device.

Fig. 4 is a side view of a notched prism cut to serve as an intermediary support between the V-shaped part and the object to be held.

Figures 5, 5A:
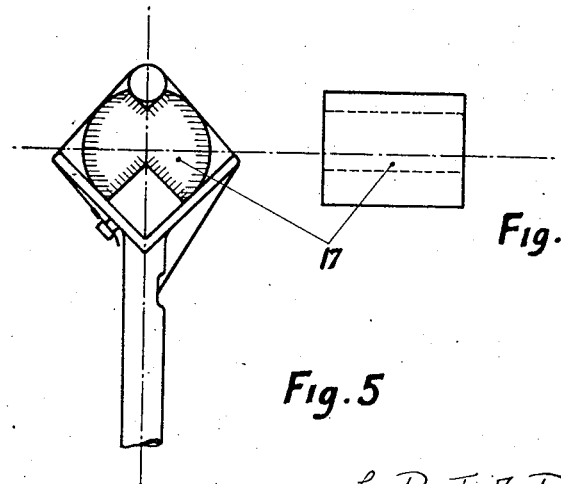

Figs. 5 and 5a correspond to Figs. 3 and 4 wherein the notched prism is replaced by a notched cylinder.

Fig. 6 is an end view and Fig. 6a a side view of a double V-shaped part serving as a sliding carriage.

Figures 1, 1A:
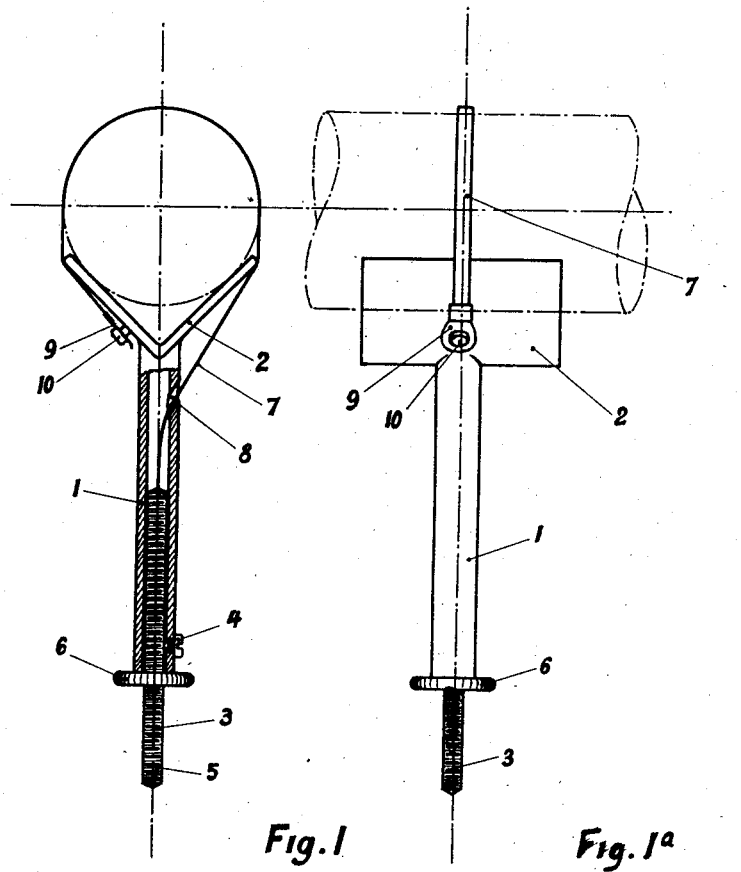
Fig. 1 is an end view of V-shaped tongs.
Fig. 1a is a side view thereof.

Referring to Figs. 1 and 1a the body of the tongs comprises a tube 1 to the end of which is soldered or brazed through its ridge a V-shaped part 2. In the tube 1 the threaded rod 3 is adapted to slide with slight friction, the rotation of which rod is prevented by a suitable device such as a projection 4 raised on the tube 1 and engaging a longitudinal groove 5 formed inside the threaded rod 3. On this rod is screwed an independent nut 6. To the inner end of the rod 3 is secured a yielding and resistant ribbon or the like elongated part 7 passing out of the tube 1 through the elongated aperture 8 and ending with an eye 9 adapted to be fitted over a knob 10 carried by part 2 after passing round the object to be held. The ribbon 7 may obviously be replaced by a flexible cable, a chain or a spring.

When it is desired to secure a cylindrical or prismatical object in the tongs, the eye 9 is released from the knob 10, the object is inserted between the sides of the V-shaped part and the ribbon 7 is wound over the object. The eye 9 is then fitted over the knob 10 and the threaded rod 3 pulled downwards after which the nut 6 is screwed down until it abuts against the end of the tube 1 and the object is fastened with the desired strength.

When it is desired to secure smaller cylinders I may use one of the following devices. One of these is shown on Figs. 2 and 2a. In the sides of the V are provided slots 11 affording a passage for the fastening means 7. The other device is shown on Figs. 3, 4, 5 and 5a. A prism having a square section 12 is disposed inside the V and along one or more edges thereof are provided V-shaped grooves 13 of varying depths. This prism may be of any suitable material. Its sides may be in immediate contact with the sides of the V. But this would require an accurate machining. In order to avoid this, I prefer to interpose between the V and the prism thin and narrow strips of a suitable plastic material such as an asbestos sheet. Instead of these strips of plastic material, I may provide one side of the prism with three projections 15 and the adjacent side with two projections 16 as shown on Fig. 4 so as to ensure a geometrically accurate positioning of the prism inside the V, whatever may be (inside certain limits) the angle between the sides of the V, the angle between the sides of the prism and the state of the surfaces of the V. I may also instead of a prism use a cylinder 17 as shown on Figs. 5 and 5a on the surface of which are provided a certain number of V-shaped longitudinal grooves of varying depths.

Obviously the prism 12 or the cylinder 17 may be either merely held between the object to be held and the V-shaped part or else secured to the latter through any suitable removable means.

The above described forms of execution of the invention are particularly adapted for rigidly securing a cylindrical object inside the V-shaped tongs. But in other cases it may be of interest to allow the object to slide between the sides of the V with slight friction. A device adapted for such a use is shown in Figs. 6 and 6a. The tongs comprise as formerly, a tube 1 soldered or brazed to the V-shaped part 2, a sliding threaded rod 3, a projection 4, a longitudinal groove 5, a nut 6, a ribbon 7, an aperture 8, an eye 9 and a knob 10. One of the edges of the V is secured in the present case through slightly yielding connections 19 to the corresponding side of another V-shaped part 20 reversely disposed over the object to be fastened and above which the fastening ribbon 7 is caused to pass. If the nut 6 is completely screwed down, the cylindrical rod 21 is held tight; but when slightly slackened, said rod may slide with slight friction with as small a play as may be desired, along the sides of the two V-shaped parts. To the lower V 20 may be soldered or brazed a rod such as 22 which may in its turn carry any suitable device. By way of example, I may provide a support constituted by a vertical rod 21 the cross-section of which may, for instance, be circular or square, carried by a support and along which the arrangement of the two V-shaped parts and of the device borne by the rod 22 is adapted to slide.

If this device is a tracing point, the whole will constitute a mechanician's gauge; if this device is a sighting telescope, a cathetometer will thus be formed for measuring differences in level; in this case if the vertical rod has a square cross-section it is preferably adapted to move round its axis and may be secured in any one of the different positions it can be given.

In order to allow the double V tongs to slide perfectly along the cylindrical rod 21 without the sides of the V requiring any machining, the sides of the V may be provided with two projections 23 so that each V may remain in contact without any play and without the necessity of any adjustment through four points with the cylindrical part of the rod.

What I claim is:

1. A precision securing device for ensuring a precise position, and always the same position, relative to the part which is secured, comprising a V-shaped member forming a geometrical dihedron, adapted to receive the part that is secured, and a flexible fastening strap adapted to pass over the part to be gripped, one end of the said strap being fixed in an easily removable manner to one of the sides of the V-shaped member, and the other end being connected to a suitable tensioning means.

2. A precision securing device for ensuring a position, and always the same position, relative to the object which is secured, comprising a V-shaped member forming a geometrical dihedron adapted to receive the object which is to be secured, a hollow tube fixed to the V-shaped member on the side opposite the bearing surfaces, a threaded non-rotatable rod slidingly operating in the hollow tube and having a clamping nut thereon in engagement with the end of the hollow tube, and a flexible fastening strap adapted to pass over the object being gripped thereby, one end of said strap being fixed in an easy removable manner to one of the sides of the V-shaped member and the other end fixed to the end of the aforesaid threaded rod.

3. A precision securing device for ensuring a position, and always the same position, relative to the part which is secured, comprising a V-shaped member forming a geometrical dihedron adapted to receive the part to be gripped, a removable block provided with longitudinal notches in the form of a geometrical V gearing with its parts not provided with notches, against the V-shaped support, and a flexible fastening strap adapted to pass over the part to be gripped, one end of the said strap being fixed in an easily removable manner to one of the sides of the V-shaped member, and a tensioning means connected to the other end of said strap.

4. A precision securing device for ensuring a position, and always the same position, relative to the part which is secured, comprising a V-shaped member forming a geometrical dihedron, a removable prismatic block provided with notches in the form of a geometrical V, bearing with its parts not provided with notches, against the V-shaped support, and a flexible fastening strap adapted to pass over the part to be gripped, one end of the said strap being fixed in an easily removable manner to one of the sides of the V-shaped member, and a tensioning means fastened to the other end of said flexible strap.

5. A precision securing device for ensuring a position, and always the same position, relative to the part which is secured, comprising a V-shaped member forming a geometrical dihedron, a removable prismatic block provided with notches in the form of a geometrical V, bearing with its parts not provided with notches, against the V-shaped support by suitable bosses or lugs, and a flexible fastening strap adapted to pass over the part to be gripped, one end of the said strap being fixed in an easily removable manner to one of the sides of the V-shaped member, and a tensioning means connected to the other end of said flexible strap.

6. A precision securing device for ensuring a precise position, and always the same position, relative to the part which is secured therein, comprising a V-shaped member forming a geometrical dihedron adapted to receive the part to be gripped, a second geometrical V-shaped member arranged in an opposite direction to the first one, and placed in opposed relation therewith, and a securing member for ensuring the support of the said parts being held, on the faces of the V-shaped member.

In testimony whereof I have affixed my signature.

LOUIS DOMINIQUE JOSEPH ARMAND DUNOYER.